United States Patent [19]
Gillard et al.

[11] Patent Number: 5,805,590
[45] Date of Patent: Sep. 8, 1998

[54] SWITCHING DEVICE FOR DIGITAL DATA NETWORKS AND ASYNCHRONOUS TRANSFER MODE

[75] Inventors: André Gillard, Sugiez; Rainer Fehr, Hofstetten, both of Switzerland

[73] Assignee: Ascom Tech AG, Gesellschaft Fur Industrielle Forschung & Technologien-Der Ascom, Bern, Switzerland

[21] Appl. No.: 500,592

[22] Filed: Jul. 11, 1995

[30] Foreign Application Priority Data

Jul. 12, 1994 [CH] Switzerland ............... 02 221/94-6

[51] Int. Cl.$^6$ ................................ H04Q 11/04
[52] U.S. Cl. .................... 370/395; 370/415; 370/503
[58] Field of Search ............ 370/60, 60.1, 94.1, 370/85.1, 100.1, 389, 392, 394, 395, 397, 399, 409, 412, 413, 414, 415, 416, 428, 429, 498, 503; 340/826; 395/427

[56] References Cited

U.S. PATENT DOCUMENTS

| | | | |
|---|---|---|---|
| 4,956,839 | 9/1990 | Torii et al. | 370/60 |
| 5,130,975 | 7/1992 | Akata | 370/60 |
| 5,214,639 | 5/1993 | Herion | 370/60 |
| 5,237,564 | 8/1993 | Lespagnol et al. | 370/60.1 |
| 5,268,896 | 12/1993 | Pauwels | 370/60 |
| 5,271,002 | 12/1993 | Barri et al. | 370/58.1 |
| 5,418,780 | 5/1995 | Henrion | 370/60.1 |
| 5,452,296 | 9/1995 | Shimizu | 370/60.1 |
| 5,453,979 | 9/1995 | Schibler et al. | 370/60.1 |
| 5,463,622 | 10/1995 | Keller et al. | 370/60.1 |
| 5,467,344 | 11/1995 | Solomon et al. | 370/58.3 |
| 5,473,598 | 12/1995 | Takatori et al. | 370/16 |
| 5,504,743 | 4/1996 | Drefenstedt | 370/60.1 |

FOREIGN PATENT DOCUMENTS

| | | |
|---|---|---|
| 0113639 | 7/1984 | European Pat. Off. . |
| 0292962 | 11/1988 | European Pat. Off. . |
| 0446387 | 9/1991 | European Pat. Off. . |
| 0569173 | 11/1993 | European Pat. Off. . |
| 9004316 | 4/1990 | WIPO . |

*Primary Examiner*—Alpus H. Hsu
*Assistant Examiner*—Kwang Bin Yao
*Attorney, Agent, or Firm*—Foley & Lardner

[57] ABSTRACT

In an ATM switch, the total required buffer storage is concentrated in a central memory which is used by all input and output channels. The connection between the input and output channels and the memory is established by a synchronous bus. The time allocation on the bus is designed in such a manner that within the transmitting time of a data cell according to the ATM norm, e.g., over a wide band network, a time slice which is sufficient for the transfer of a complete data cell between an input or an output and the memory is allocated to each input and output. The memory is fixedly divided into areas of the same size, each of the areas serving as a buffer for a respective input. Due to the simple time allocation of the bus it is possible to combine a plurality of input and output channels in an input/output unit and to still realize the latter in a small number of integrated circuits. For the memory, unexpensive standard memory devices can be used.

17 Claims, 3 Drawing Sheets

SWITCHING DEVICE FOR DIGITAL DATA NETWORKS AND ASYNCHRONOUS TRANSFER MODE

The present invention refers to switching devices for digital data networks in which the transfer of data takes place in the form of digital data cells consisting each of a data part and a control part. Devices of this type are herein called ATM switches, ATM standing for "asynchronous transfer mode".

BACKGROUND OF THE INVENTION

For future wide band ISDN networks, the so-called asynchronous transfer mode (ATM) is projected for increased transfer rates and a high flexibility. On account of the asynchronous operation, the relays or switches in the ISDN networks must be capable of temporarily storing relatively extensive amounts of data until it is possible to transmit the data to the next switch or receiver. In addition, each switch must be capable of decoding address fields of the arriving data packets and to transform them into one or several new destination addresses in function of the available output lines. These combined requirements of intelligent logic and high storing capacity have made it impossible up to now to design an ATM switch for a small number of inputs and outputs at a reasonable cost-performance ratio. For this purpose, it is is, for example, necessary to realize almost all functions in the form of integrated circuits. However, this has been deemed impossible hitherto because of the relatively high space consumption of the required storage cells as well as the complex structure of the necessary logic circuits, so that the known embodiments have been assembled from discrete components and simple standard integrated circuits.

It is an object of the present invention to provide an ATM switch for a small number of inputs and outputs whose structure is better adapted to the use of suitable specific integrated circuits.

SUMMARY OF THE INVENTION

Such a switching device for digital data networks, more particularly for telephone networks, in which the transfer of data takes place in the form of digital data cells consisting each of a data part and a control part, the control part comprising an address part, is provided with at least two inputs, two outputs, and a memory which comprises a buffer area for each of the inputs, the buffer area consisting of storage cells in each of which at least one data cell is capable of being stored, each input being capable of storing data cells in its allocated buffer area, and each output being capable of accessing any data cell stored in any buffer area.

Accordingly, it is proposed not to provide the necessary storage facility for the temporary storage of said data cells separately for each input and output. Instead, a central memory is used which is accessed by all inputs and outputs by a fast bus. This is advantageous in that standard components from other areas of digital technology can be used for this memory precisely because of its increased capacity.

The concentration of the temporary memory allows to combine the remaining logic circuitry for a plurality of inputs and outputs in one set of chips, i.e., in one set of integrated circuits. In a preferred embodiment of the invention it is possible to use a number of such chip sets according to the requirements in order to obtain ATM switches having different numbers of inputs and outputs. The logical linkage and synchronization of the chip sets with the memory over a common bus can be realized by only one additional control line.

BRIEF DESCRIPTION OF THE DRAWINGS

The invention will be further explained by way of a preferred embodiment with reference to the drawings.

DETAILED DESCRIPTION OF THE INVENTION

Figure 1:
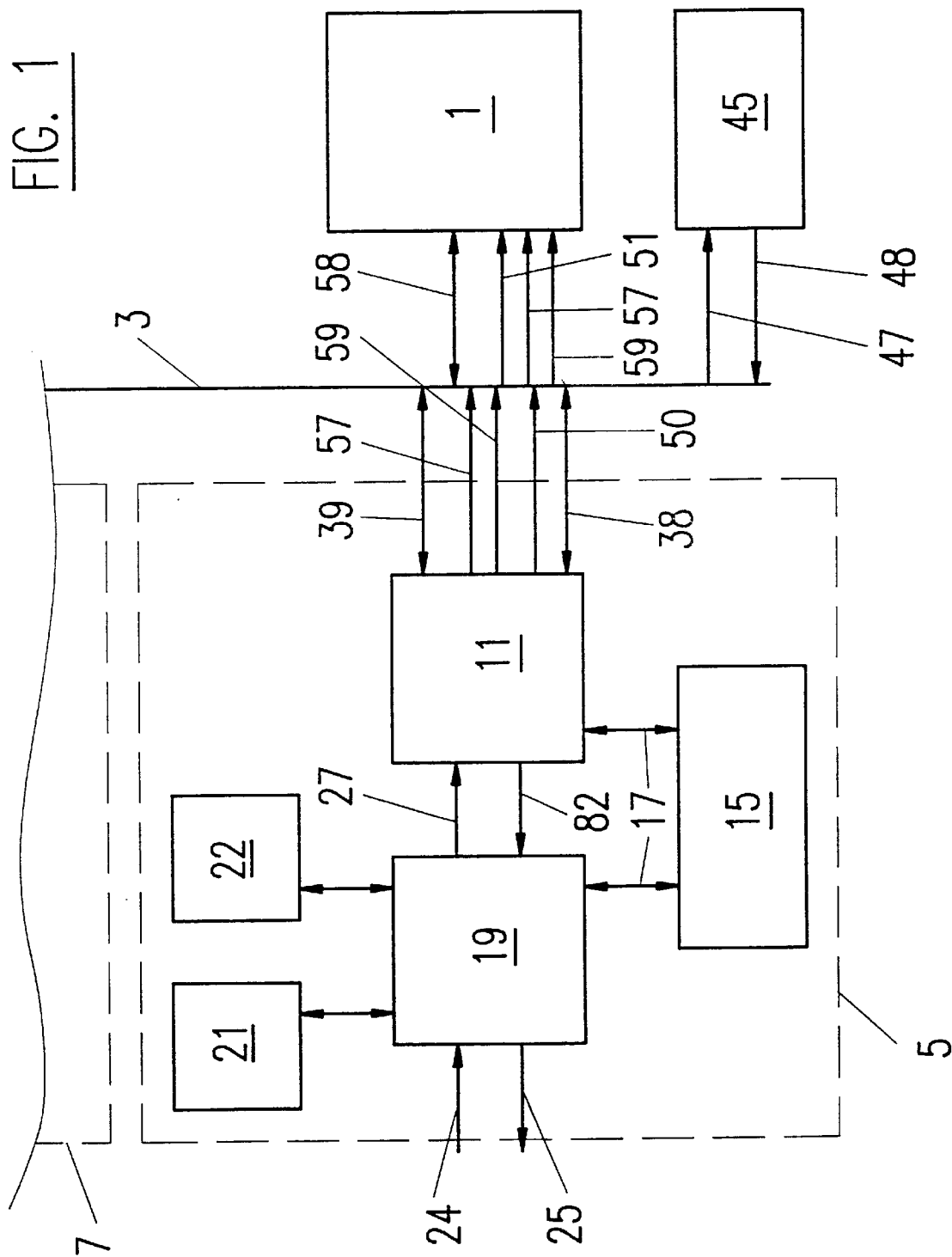
FIG. 1 shows a circuit block diagram of a switch according to the invention.

According to the actual ATM norm for wide band ISDN networks, data are transferred at a speed of 155 Mbit/sec in the form of packets of 53 bytes each, one byte comprising 8 bits. In the framework of the present description, 1 Mbit and 1 Mbyte always indicates 1 Mbyte always indicate $10^6$ bits resp. $10^6$ bytes if not indicated otherwise.

A so-called ATM switch serves for the random connection of a plurality of lines, for which purpose it is provided with a number of inputs and outputs. The routing, i.e., the designation of the output to which data cells arriving at an input and having a certain address part shall be directed, is either predetermined in the switch or varied in operation according to the current requirements, as is the case in conventional, analog telephone switching centers. However, an ATM switch allows a more free routing, such as the distribution of a data cell to a plurality of outputs ("broadcasting") or the concentration of data cells having different addresses and arriving at the switch on different inputs, to a single output line.

In the network itself, the data are transmitted bit-serially, the ATM switch receiving and transmitting them by simple serial-parallel converters in the form of bytes, i.e., always 8 bits in parallel. The data are transmitted in packets of 53 bytes according to the ATM norm, each packet containing 48 data bytes. The remaining 5 bytes serve for the determination of the destination address, amongst other purposes.

In order to maintain the transmitting speed of an ATM network, it is necessary that the ATM switches in the network can process the data at the nominal speed of about 19.44 Mbyte/s under almost all operating conditions.

FIG. 1 shows the construction of an ATM switch according to the invention in a block circuit diagram. It comprises a memory 1 which is connected by a bus 3 to an input/output unit 5. Optionally, one or more additional input/output units 7 having essentially the same construction as input/output unit 5 may be connected to the bus. The ATM switch of the example is designed for at least one input/output unit having four input/output channels, and a maximum of 4 such input/output units. Thus, a connecting capacity of 4×4 to 16×16 in steps of four is obtained (4×4=4 inputs and 4 outputs).

Bus

Bus 3 must be capable, in the most expanded configuration, of transferring a data cell from each input to the memory 1 and also a data cell from the memory 1 to each output within the time which is available for transmitting a data cell according to the ATM norm. This time is about 2.73 µs, resulting from a transmitting rate of 155 Mbit/s and the size of a data cell, i.e., 53 bytes or 424 bits.

This requirement of the bus 3 is positively fulfilled if each input and output disposes of a fixed time window of 85 ns, on the base of a maximum expansion to 16 inputs and 16 outputs. It is thus ensured that the transfer rate does not decrease even under maximal utilization of the switch. Also, a substantial simplification of the bus access results from the fixed allocation. A synchronous bus is generally controlled by a single counter, namely the main counter. The count value of the counter must be known to all units connected to the bus, resulting in a considerable number of additional lines at the bus. In view of an extensive realization of the function units of the switch in the form of integrated circuits, however, the number of lines must be kept at a minimum since the number of connectors on a case for integrated circuits is limited.

With respect to the bus control, this is achieved in accordance with the present invention by providing each input/output unit as well as also the remaining units, as far as necessary, with an own bus counter. The counters are set to a predetermined initial value at the beginning of a bus cycle by a single synchronization signal which is supplied by a main counter. In the present case, one bus cycle includes one time slice for each input and output and has thus a maximum duration of about 2.73 µs (microseconds), as mentioned above.

One of the bus counters 9 (FIG. 2), which is located inside control unit 11 of input/output units 5, 7 is being used as a main counter. In practice, this is effected by inserting input/output units 5, 7 in connector strips of the ATM switch which are numbered, e.g., from 0 to 3 and are coded according to their number, e.g., by connections between certain contacts or by fixed voltages which are applied to contacts of the connector strip. It is defined that one predetermined strip, e.g., strip 0, must be fitted with an input/output unit 5 in any case. The counter of this input/output unit 5 is configured as the main counter by the coding of the connector strip, and its synchronization terminal 13 is configured as an output. Those of counters 9 of the remaining input/output units 7 are configured as inputs. The bus clock, which is available on bus 3 and generated by a conventional clock generator (not shown), serves as a clock signal for bus counters 9.

Thus, in the present ATM switch, the bus counter of a given input/output unit is configured as a main counter by the position of the input/output unit in the switch and supplies synchronization signals. All other bus counters of the remaining units are synchronized with the bus by the synchronization signals and go to a predetermined initial state when a synchronization signal is received.

In order to reduce the speed requirements, the bus is designed for a data width of 144 bits, so that a data cell (424 bits) is transmitted in three bus phases.

Input channel

Figure 2:
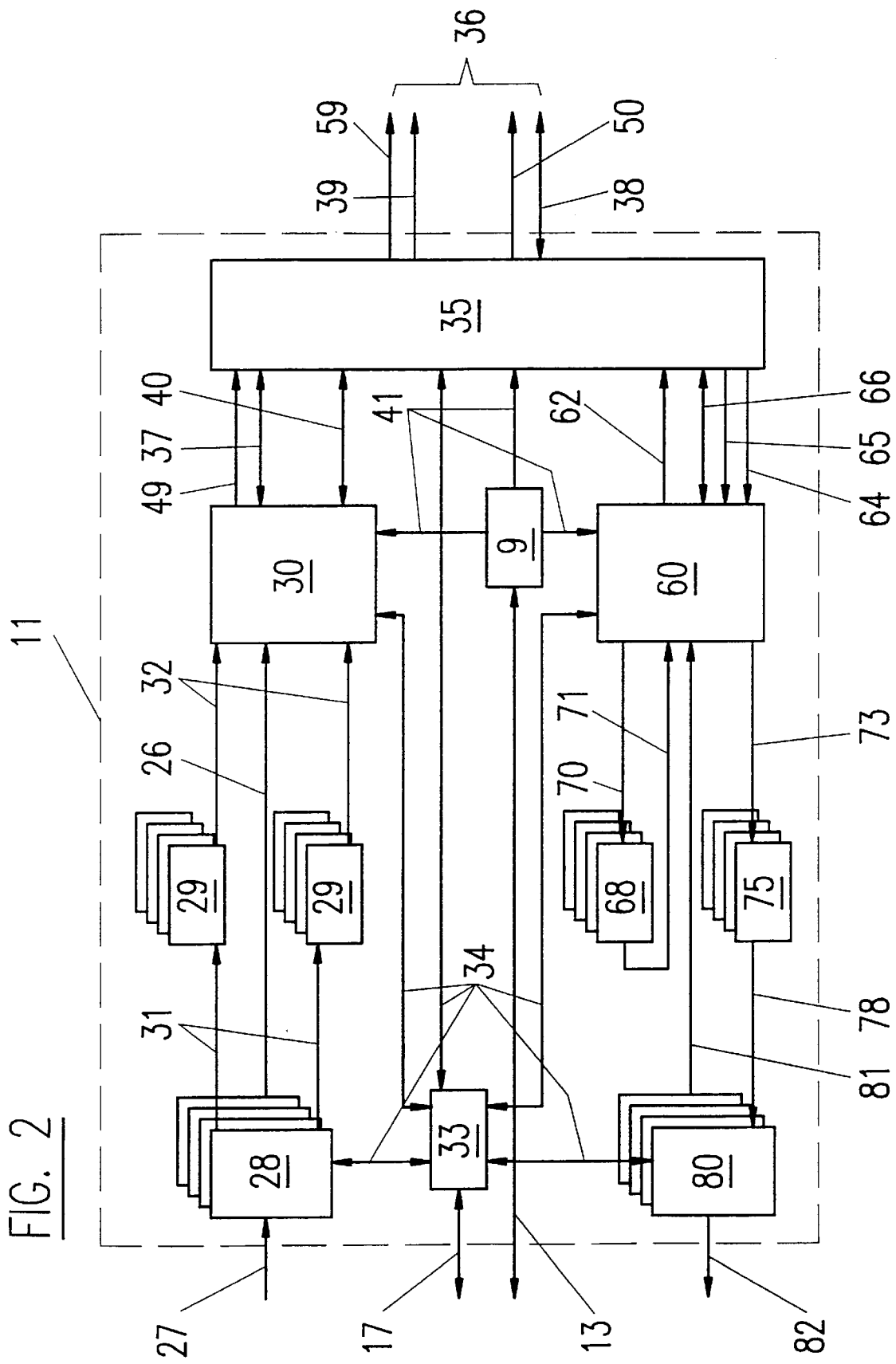
FIG. 2 shows the circuit block diagram of the control unit of an input/output unit.

An input/output unit 5, 7 essentially comprises control unit 11, board controller 15, data exchange module 19, one input conversion table 21 per input 24, and one output conversion table 22 per output 25. Data exchange module 19 connects the input/output unit to the external data network by four network inputs 24 and four network outputs 25. The network inputs and outputs are designed for a transmission in bytes, i.e., for 8 bits simultaneously. A data cell supplied to data exchange module 19 through network input 24 is first converted by the former to an internal format by replacing the address part by the contents of the corresponding entry in input conversion table 21 of input 24. In this internal form, the data cell is supplied by lines 27 to input circuit 28 of control unit 11 (FIG. 2).

While the transmission rates of the external network and of the switch coincide, the phase of the incoming data is shifted with respect to the internal clock of the switch. For this reason, the data cells are first stored in an input buffer 29 from which they are fetched by input module 30 which is synchronized with the bus. Buffer 29 need only have a small capacity, e.g., for 3 data cells. In the buffer, an extension of the transmission width of the data from 8 bits (line 31) to 24 bits on line 32 is preferably effected as well. Input module 30, controlled by bus counter 9, takes over the presently oldest data from input buffer 29 and effects another extension of the data width to 144 bits (line 49). The presence of a data cell in input buffer 29 and its address in the input buffer are supplied from input circuit 28 to input module 30 by line 26.

In the present example, each input/output unit 5, 7 is provided with 4 inputs and outputs, respectively, to the external network which are designated each by a number from 0 to 3. Each of the inputs 24 comprises an input circuit 28 and an input buffer 29 and is referred to as an input channel hereinafter. Input module 30, however, is only provided once and thus also serves multiplexing functions. The data are supplied from input module 30 to bus terminal 36 by bus interface 35 and finally to bus 3. More particularly, the data (424 bits) are supplied to the bus 3, in three consecutive phases of bus 3 within the time slice which is allocated to the corresponding input channel. In addition, the destination address in the internal format, i.e., the routing address, is made available on the bus by lines 39.

Figure 3:
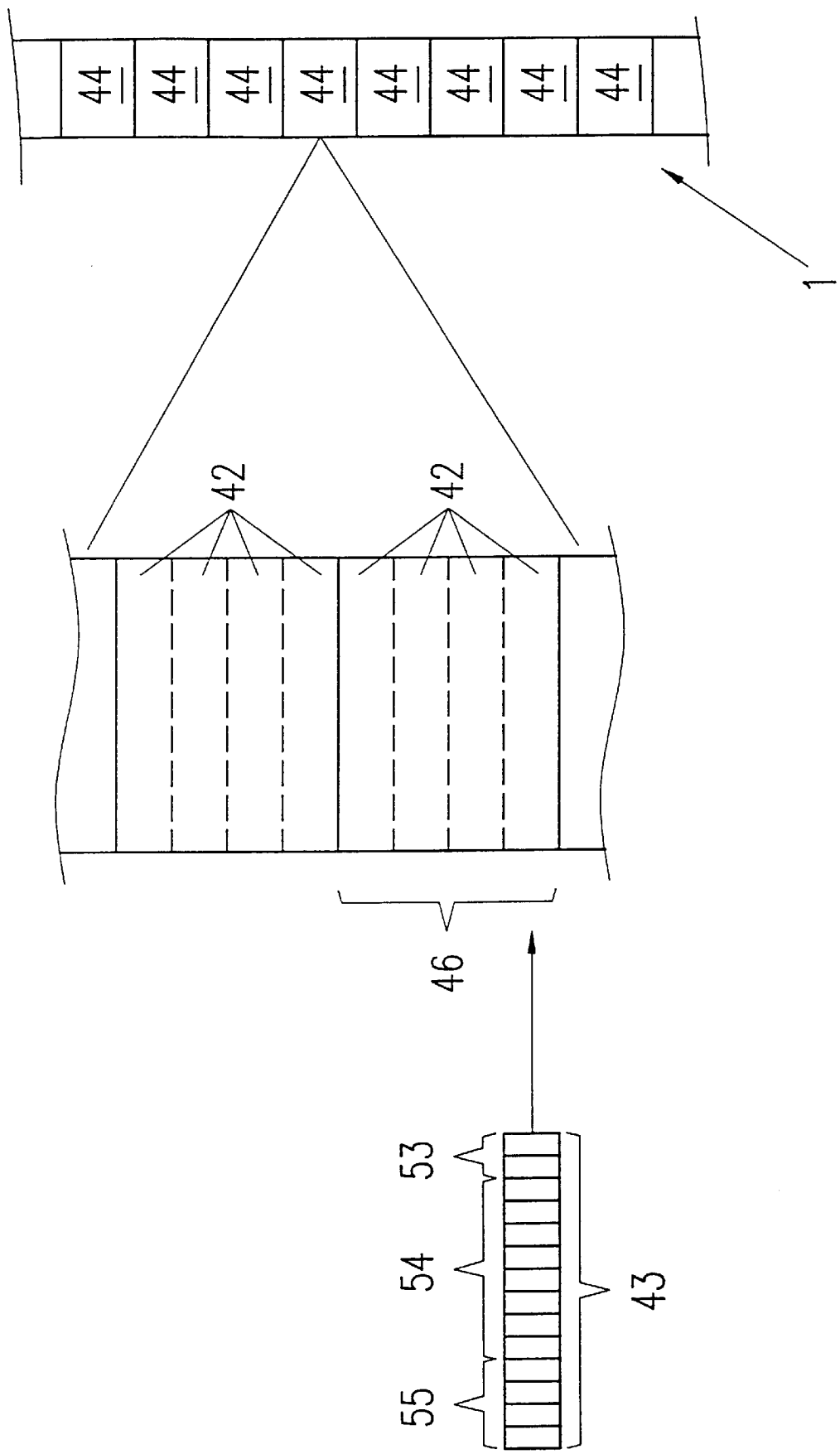
FIG. 3 schematically shows the structure of the memory.

To each input channel, an additional counter in input module 30 is assigned. The counter serves the purpose of indicating in which memory address of the buffer assigned to the input channel the data cell is to be stored. The counter works as a ring counter, and its count value is modified by one with each data cell transferred to buffer 44 (FIG. 3) of the input channel (see below, "Memory"). When a predetermined end value is attained, the counter jumps back to its initial value. The range between the initial value and the end value is smaller than or preferably equal to the number of storage cells 46 in buffer 44. The count of the counter is equivalent to the cell address 54 in memory 1 described below. It is supplied to bus interface 35 by line 37 and then placed on the bus. Likewise, the number of the input and the number of the input/output unit 5 is supplied to bus 3, the numbers also being necessary for addressing the memory and giving together the channel number 55 (FIG. 3) which is unique for each input channel within the switch. The control of the data transfer between input module 30 and bus interface 35 is effected by line 40.

By lines 41, input module 30 (FIG. 2) as well as bus interface 35 receive the information generated by bus counter 9 regarding the actual status of bus 3, in particular regarding the time when they can access bus 3.

Routing table

Referring again to FIG. 1, from terminal 47, routing table 45 receives the internal routing address generated by an input channel and generates the routing information therefrom. The routing information is a bit mask wherein each bit codes for an output channel, i.e., a network output 25. If the bit is set, e.g., is logical high, this means that the data cell with the present routing address must be output by the output channel corresponding to the bit, and vice versa. The bit mask is available through terminal 48 of routing table 45 (FIG. 1) on separate lines of bus 3.

Memory

Memory 1 (FIG. 3) comprises a number of storage locations 42 having the width of the bus (144 bits) and being addressable by storage addresses 43. A determined area 44 of consecutive addresses is allocated to each input channel. The area 44 can, e.g., contain $256=2^8$ data cells per input channel. For the sake of simplicity, not the minimum number of 3 storage locations 42 is used, but $4=2^2$. Thus, address 43 for a memory location, contemplated as a binary number, is composed as follows: 2 bits for the location number 53 (bits 0–1); 8 bits for the cell address 54 (bits 2–9), the storage cell 46 being construed to be constituted by four consecutive memory locations 42 although three cycles of 144 bits are sufficient; and 4 bits for the input channel number 55 (bits 10–13). Memory 1 thus has a total capacity of $2^{14}$ storage locations. Such a memory can be assembled by parallel connection of commercially available, low-priced standard memory devices, e.g., of the type having $2^{14}$ 8-bit locations, of which 18 units must be connected in parallel.

A suitable type of memory is, e.g., the MCM62940A "Synchronous Static Burst RAM" (available from Motorola) having an organization of $32 \times 2^{10}$ bits×9. 16 of these memory units must be connected in parallel in order to attain the memory word width of 144 bits.

As a lower limit for the capacity of a buffer area 44, 2 data cells can be assumed. However, the capacity can be chosen according to the circumstances, i.e., at random in the range of 2 to 256 data cells and above. In this context, the upper limit is determined, amongst other things, by the expenditure for the memory and the lower limit is determined by the requirement that an overflow of the buffers should be avoided under all circumstances. Such an overflow may occur when the data cells cannot be processed fast enough by all concerned output channels, and leads to the loss of data cells. With the suggested capacity of 256 data cells, such an overflow is excluded in practice. In the case of smaller buffers down to 2 data cells, additional security measures preventing an overflow may be used in a manner known per se.

Location number 53 is derived from the respective bus phase, for which purpose memory 1 is configured as a burst memory: it comprises a counter which is reset at the beginning of the transmission of a data cell, i.e. in the first bus phase, and which is incremented by one in the following bus phases during which the remaining parts of the data cell are transmitted. The signal for the beginning of a transmission is recognized by the memory by the signal 59 for a memory access which is generated by input/output units 11, available on bus 3, and which is, e.g., active during a write or read access of the memory, so that the transition from inactive to active marks the beginning of an access.

Channel number 55 is generated by input module 30 and transferred to bus interface 35, which outputs the channel number as a part of the memory address, over lines 37.

Finally, the remaining part of memory address 43, i.e. cell number 54, is transmitted to the memory from the respective input or output channel by terminal 50, bus 3, and the address terminal of memory 1 on bus 3. Memory 1 is also switched between storing and readout by input/output units 5, 7 by the use of a special read/write signal 57 which is generated by bus interface 35 according to whether an input channel or an output channel is accessing the bus. Alternatively, the read/write signal may also be derived from the condition of bus counters 9, since memory 1 is always written during a time slice which is assigned to an input channel, and a readout access of the memory can occur only during a time slice which is assigned to an output channel. The data transfer is effected by data terminal 58 of memory 1 on bus 3.

Overall, for each input/output unit 5, 7, the memory 1 behaves as if a buffer 44 of a certain capacity were provided for each input channel. The buffer comprises a certain number of storage cells 46 each of which is addressed by a respective cell address and can contain one data cell. For the transfer of a data cell into or out of the memory 1, the cell is divided into three portions each of which includes a maximum of 144 bits. The three portions are consecutively written into or read out of memory locations 42 of storage cell 46 in consecutive bus phases.

The concept provides sufficiently large buffers to avoid an overflow. Consequently, a filling control may be omitted. The buffers may thus operate as ring buffers which are controlled by incoming packets only.

Output channel

Each input/output unit 5, 7 (FIG. 2) comprises four output channels. For the four output channels of an input/output unit 5, 7, an output module 60 is provided which is connected to bus 3 by bus interface 35. The function of output module 60 is essentially inverse to that of input module 30. It disposes of an output line 62 for issuing a cell address 54 for memory 1 to bus interface 35, and of inputs 64 for the data of the addressed storage cell, inputs 65 for the routing information, and further lines 66 for the control of the data transfer between bus interface 35 and output module 60. Inputs 41 ensure the connection to bus counter 9, and one of lines 34 ensures the connection to board controller interface 33.

Cell pointer queue 68, i.e., a waiting queue for cell pointers, is connected to output module 60 by an input 70 and an output 71. Another output 73 of output module 60 leads to the output buffer 75. Output buffer 75 essentially performs the inverse function of input buffer 29, namely the phase conversion between the internal switch clock and the clock which is given by the external network. Output buffer 75 also has a relatively small capacity of three data cells.

From output buffer 75, the data cells are supplied by outputs 78 to output circuit 80 which performs the adaptation to the network output 25. Cell pointer queue 68, output buffer 75, and output circuit 80 are provided once for each output channel, i.e., fourfold in each input/output unit 5, 7. The queue can hold 256 pointers. By the relatively large capacity, as in input channel buffers 44, the necessary overflow security is attained. However, since the pointers only occupy 16 bits, the storage capacity is small enough to allow an implementaion in an integrated circuit together with the other functions.

Output module 60, which knows the number of an input/output unit 5, 7 in the switch, e.g., by the coding of the plug-in connector of the input/output unit, is continuously watching whether the respective bit for one of its output channels is set in the routing information which is just available on bus 3. If this is the case, output module 60 gets the cell address 54 for memory 1 from the bus and writes it into the cell pointer queue 68 of the corresponding output channel.

Output circuit 80, which is synchronized to the external network, reports its readiness to send a cell to output module 60 by line 81. If this is the case, output module 60 checks at the beginning of the time slice which is allocated to one of the output channels of output module 60 whether one or more cell pointers are stored in cell pointer queue 68 of this output channel. In this case, at the beginning of the time slice which is allocated to this output channel, the cell pointer which is waiting longest is extracted from cell pointer queue 68 and supplied via bus interface 35 to bus 3 by output module 60 together with a readout signal 57 for memory 1. This address must also include the channel number 55 since the data cell could have been written into the memory by every one of the maximally 16 input channels of the switch. The channel number has been stored in cell pointer queue 68 together with cell address 54 by output module 60.

The contents of the addressed storage cell 46 extracted from the memory, i.e., the data cell to be extracted, is supplied through the bus interface and data lines 64 which are still 144 bits wide to output module 60 in three consecutive bus phases. Output module 60 performs, conversely to input module 30, a conversion to only 24 bits wide data outputs 73 to output buffer 75.

If data are present in output buffer 75, these are output synchronously to the external network by output circuit 80 in chronological sequence on the corresponding output 82.

According to FIG. 1, the data are supplied by outputs 82, which operate in the internal format, to data exchange module 19. In the module 19, the data cell is converted to the external format by the use of output conversion table 22 and read out into the external network by outputs 25 of the switch. Network outputs 25 are designed like inputs 24 for a data transmission by bytes.

The initialization of the switch, and more particularly of the input conversion table 21, the output conversion table 22 as well as of the routing table is effected by board controller 15. Also, it performs the necessary modifications of the configuration of the switch in operation, in particular modifications of routing table 45 during the completion and the clearing of data connections. For this purpose, it is connected to control unit 11 and data exchange module 19 by terminals 17.

With the concept of a small capacity ATM switch exemplified above it is possible to realize the relatively large necessary buffer storage in a common memory 1 for all inputs and outputs. At the current state of the art, the remaining functions for the input/output units can thus easily be realized in the form of integrated circuits, in particular also by means of programmable logic circuits or Application Specific Integrated Circuits ("ASICs"). In this context, an essential factor is the fixed allocation of memory locations to the inputs provided in the maximally expanded configuration of the switch, on one hand, and the fixed allocation of time slices on the bus which ensures the communication between the input/output units and the memory, to the input and output channels also of the maximally expanded switch. It is thus possible to reduce the logic which is necessary for the control of the data flow to a minimum. Since a bus cycle is composed of the time slices for all possible input and output channels, each function unit of the switch is capable of determining which unit is in the process of transmitting data on the bus just by counting the bus clock. Also, this allows a substantial reduction of the connections between the various function units of the switch.

In the indicated configuration, only three lines are required for this purpose, namely one which determines whether the internal clock counter of the function unit must generate or receive the bus synchronization signal, one which supplies the synchronization signal from the bus clock counter which generates the bus synchronization signal for the other counters, and one for the bus clock. In an extreme case, however, only one line for the bus synchronization signal is sufficient, namely if the bus clock counter which generates the synchronization signal is predetermined and the bus clock of the function unit is generated by a local clock generator.

Another advantage of the proposed concept is that a multiple storage of data cells which are intended for a plurality of outputs is avoided. They are stored in the memory only once and are extracted by the corresponding output channels when required.

In principle, the connection to the memory may be designed for a width of 8 bits, which is the form in which the data usually arrive at the inputs of the switch, up to the full width of the data cell (53 bytes). The minimum width also leads to a minimal number of connecting lines but requires a correspondingly large number of bus phases for transmission, which results in requirements with respect to the access times of the memory devices which cannot be met in practice because of the fixed duration of the time slices. The maximum width, in contrast, leads to a very large number of lines which are used for the bus, as well as to a very large number of memory devices which must be connected in parallel. The embodiment of the example, where each data cell is transmitted in three portions of 18 bytes each, has been found to be a viable compromise. In this case, only three of the four storage locations of a storage cell are used. This solution offers a well feasable compromise between the bus width, the data transfer speed, and the expenditure for the memory.

With a fixed number of 256 storage cells per input unit, the memory can then be composed of blocks having $2^{14}$ storage locations each which are currently available on the market and therefore inexpensive. The required data width of 18 bytes=144 bits is obtained by a suitable parallel connection of the memory devices. It is also possible to combine memory devices having a smaller capacity or to use a different bus timing, so that, e.g., the free fourth bus phase is omitted. It is also conceivable to provide a narrower bus, e.g., only 14 bytes=112 bits in width. Thus, also the fourth bus phase is used for the transfer of a data cell, and on the other hand, the memory can be narrower but without any reserve.

It is also conceivable that each time slice of the bus allows the transfer of a part of a data cell only, i.e., that a data cell is transferred, e.g., in 4 consecutive bus cycles. In this case, in order to avoid the need for transmitting the location number 53, the number of bus cycles which is necessary for the transfer of a data cell is preferably considered as a group again, the synchronization signal for the bus being generated in the first bus cycle of the group.

The described embodiment is considered as an example of a preferred embodiment of the invention only. In addition to the mentioned modifications, further ones are accessible to those skilled in the art without leaving the scope of the invention.

We claim:

1. A switching device for digital data networks in which the transfer of data takes place in the form of digital data cells each comprising a data part and a control part, said control part comprising an address part, and said switching device having at least two inputs and two outputs, said switching device comprising:

a memory having a buffer area allocated for each of said inputs, the buffer area including storage cells in each of which at least one data cell is capable of being stored, each input being capable of storing data cells in the respective allocated buffer area, and each output being capable of accessing any data cell stored in any buffer area in the memory, wherein the connection between said memory and said inputs and outputs is established by a synchronous bus, the data transfer on said synchronous bus being controlled by a bus clock, and wherein said data transfer on said synchronous bus is effected in bus cycles, each bus cycle being divided into at least as many time slices as the total number of inputs and outputs, and each time slice being fixedly allocated to a respective input and output.

2. A switching device according to claim 1, further comprising a bus control unit provided for each input and each output in order to generate, during the time slice which is allocated to the respective input or output, a signal which indicates a data transfer to said memory in the case of an input and from said memory in the case of an output, and wherein said signal which is generated by said bus control unit indicates a utilization of said time slice for a data transfer by said input or said output, and more particularly indicates a beginning and an end of the utilization.

3. A switching device according to claim 1, wherein each time slice is divided into at least two bus phases, each of said bus phases permitting the transfer by said synchronous bus of a part of a data cell, wherein a bus cycle is identical to a cycle group, said synchronous bus comprising a number of data lines corresponding to said part of a data cell and serving for the transfer of the data of a data cell, and wherein the quantity of data which is transferred by the synchronous bus in all bus phases of a time slice is at least equal to that of a data cell.

4. A switching device according to claim 3, wherein the connection of said memory as well as the connections of said inputs and outputs to said synchronous bus are each capable of simultaneously transmitting at least as many bits as are comprised in the part of a data cell which can be transferred in one bus phase.

5. A switching device according to claim 1, wherein each time slice comprises at least one bus phase, each of said bus phases permitting the transfer by said synchronous bus of a part of a data cell, wherein said synchronous bus comprises a number of data lines corresponding to said part and serving for the transfer of the data of a data cell, and wherein at least so many cycles of said synchronous bus are combined to form a cycle group such that the quantity of data which is transmitted by the synchronous bus in all bus phases of the same time slices of all cycles of said cycle group is at least equal to that of a data cell.

6. A switching device for digital data networks in which the transfer of data takes place in the form of digital data cells each comprising a data part and a control part, said control part comprising an address part, and said switching device having at least two inputs and two outputs, said switching device comprising:

a memory having a buffer area allocated for each of said inputs, the buffer area including storage cells in each of which at least one data cell is capable of being stored, each input being capable of storing data cells in the respective allocated buffer area, and each output being capable of accessing any data cell stored in any buffer area in the memory, wherein each storage cell includes at least two storage locations, a capacity of all storage locations of one storage cell being sufficient for storage of at least one data cell, and wherein at least the portion of a data cell which is capable of being transferred in one bus phase can be stored in each of said storage locations.

7. A switching device for digital data networks in which the transfer of data takes place in the form of digital data cells each comprising a data part and a control part, said control part comprising an address part, and said switching device having at least two inputs and two outputs, said switching device comprising:

a memory having a buffer area allocated for each of said inputs, the buffer area including storage cells in each of which at least one data cell is capable of being stored, each input being capable of storing data cells in the respective allocated buffer area, and each output being capable of accessing any data cell stored in any buffer area in the memory, wherein an input number which is unique within said switching device is allocated to each of said inputs, and wherein the address of a storage location comprises the cell address, the input number, the sequence number of the bus phase within a time slice, and the sequence number of the bus cycle within the cycle group.

8. A switching device for digital data networks in which the transfer of data takes place in the form of digital data cells each comprising a data part and a control part, said control part comprising an address part, and said switching device having at least two inputs and two outputs, said switching device comprising:

a memory having a buffer area allocated for each of said inputs, the buffer area including storage cells in each of which at least one data cell is capable of being stored, each input being capable of storing data cells in the respective allocated buffer area, and each output being capable of accessing any data cell stored in any buffer area in the memory, wherein an input number which is unique within said switching device is allocated to each of said inputs, wherein the address of a storage location comprises at least a cell address and the number of the input in whose buffer area said storage cell is located, and wherein means are provided in said memory in order to store and read out the parts of a data cell transmitted in different bus phases from different respective storage locations of the addressed storage cell.

9. A switching device for digital data networks in which the transfer of data takes place in the form of digital data cells each comprising a data part and a control part, said control part comprising an address part, and said switching device having at least two inputs and two outputs, said switching device comprising:

a memory having a buffer area allocated for each of said inputs, the buffer area including storage cells in each of which at least one data cell is capable of being stored, each input being capable of storing data cells in the respective allocated buffer area, and each output being capable of accessing any data cell stored in any buffer area in the memory, wherein at least two respective inputs and two respective outputs are combined in a respective input/output unit, in that a first input/output unit is provided, and, up to a maximum number of input/output units, at least one additional input/output unit is capable of being connected to said device in order to increase the number of inputs and outputs, and wherein means are provided in order to generate a synchronization signal only once in a bus cycle which designates the beginning of a cycle.

10. A switching device according to claim 9, wherein said means for generation of said synchronization signal is a counter in said first input/output unit which is controlled by said bus clock and comprises an output for said synchronization signal, and wherein each of said at least one additional input/output unit comprises a counter which is provided with inputs for said synchronization signal.

11. A switching device according to claim 10, wherein each of said counters comprises a means for determining a time slice sequence number in a bus cycle.

12. A switching device for digital data networks in which the transfer of data takes place in the form of digital data cells each comprising a data part and a control part, said control part comprising an address part, and said switching device having at least two inputs and two outputs, said switching device comprising:

- a memory having a buffer area allocated for each of said inputs, the buffer area including storage cells in each of which at least one data cell is capable of being stored, each input being capable of storing data cells in the respective allocated buffer area, and each output being capable of accessing any data cell stored in any buffer area in the memory; and
- a routing table having entries, each of said entries defining a routing information for an address part or a range of address parts of data cells arriving by an input, said routing information indicating by which outputs said data cell must be output into the data network.

13. A switching device according to claim 12, wherein said routing information comprises a bit mask, and wherein a bit of the bit mask is allocated to each of said outputs and the state of a bit of the bit mask indicates whether said data cell must be output to the network by the output which is assigned to said bit of the bit mask.

14. A switching device for digital data networks in which the transfer of data takes place in the form of digital data cells each comprising a data part and a control part, said control part comprising an address part, and said switching device having at least two inputs and two outputs, said switching device comprising:

- a memory having a buffer area allocated for each of said inputs, the buffer area including storage cells in each of which at least one data cell is capable of being stored, each input being capable of storing data cells in the respective allocated buffer area, and each output being capable of accessing any data cell stored in any buffer area in the memory; and
- a cell pointer queue for each of said outputs, said cell pointer queue having queue locations in each of which a pointer for a storage cell in said memory is capable of being stored,
- wherein said cell pointer queue comprises an input and an output, said pointers being capable of being stored in said cell pointer queue via said input, and
- wherein said pointers are capable of being read out at the output of said cell pointer queue in a chronological sequence according to which they have been stored in said cell pointer queue.

15. A switching device according to claim 14, wherein a connection between said memory and said inputs and outputs is established by a synchronous bus, wherein means are connected to said cell pointer queues which monitor said routing information on said synchronous bus as to whether the bit which is allocated to a particular output indicates that a data cell which is destined for the particular output is being transferred to said memory during the current bus cycle, and which, in this case, said means derives the address of the storage cell in said memory from the cell address and the bus cycle number and stores the address of the storage cell in the cell pointer queue of said particular output.

16. A switching device for digital data networks in which the transfer of data takes place in the form of digital data cells each comprising a data part and a control part, said control part comprising an address part, and said switching device having at least two inputs and two outputs, said switching device comprising:

- a memory having a buffer area allocated for each of said inputs, the buffer area including storage cells in each of which at least one data cell is capable of being stored, each input being capable of storing data cells in the respective allocated buffer area, and each output being capable of accessing any data cell stored in any buffer area in the memory, wherein the connection between said memory and said inputs and outputs is established by a synchronous bus, the data transfer on said synchronous bus being controlled by a bus clock; and
- phase matching means for each output and each input, said phase matching means performing an adaptation of a phase relationship between the data cells of the data network and the bus clock of said synchronous bus,
- wherein said phase matching means are formed by a respective register for each input and each output, said register being capable of storing at least one data cell, and
- wherein the writing and the readout from said register is effected with different respective clocks.

17. A switching device according to claim 16, wherein said register is capable of storing at least three data cells.

* * * * *